US012731047B2

(12) United States Patent
Phua et al.

(10) Patent No.: US 12,731,047 B2
(45) Date of Patent: Sep. 8, 2026

(54) TEMPORARY ANALYTIC WITHIN SECURITY SYSTEM SITE

(71) Applicant: MOTOROLA SOLUTIONS, INC., Chicago, IL (US)

(72) Inventors: Jin Hoe Phua, Chenderiang (MY); Chun Meng Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1081 days.

(21) Appl. No.: 17/302,716

(22) Filed: May 11, 2021

(65) Prior Publication Data

US 2022/0366275 A1 Nov. 17, 2022

(51) Int. Cl.
*G06N 5/04* (2023.01)
*G06F 16/73* (2019.01)

(52) U.S. Cl.
CPC ............... *G06N 5/04* (2013.01); *G06F 16/73* (2019.01)

(58) Field of Classification Search
CPC ........ G06N 5/04; G06F 16/73; G08B 29/185; G08B 13/19663; G08B 25/014; G08B 13/19613
See application file for complete search history.

(56) References Cited

U.S. PATENT DOCUMENTS 6,958,676 B1 10/2005 Morgan et al.
6,971,008 B2 11/2005 Wasilewski et al.
7,847,820 B2 12/2010 Vallone et al.
9,412,142 B2 8/2016 Pederson
9,432,632 B2 8/2016 Cheng et al.
9,503,636 B2 11/2016 Brockway, III et al.
9,774,586 B1 9/2017 Roche et al.
10,249,069 B1 * 4/2019 Kerzner ................ G06V 20/52
10,582,163 B2 3/2020 Hodge et al.
10,636,173 B1 * 4/2020 Beach ................... G06V 10/82
10,645,350 B2 5/2020 Titus et al.
10,768,784 B2 9/2020 Shearer et al.
10,841,307 B2 11/2020 Smith et al.
10,850,005 B2 12/2020 Clower et al.
2011/0169950 A1 * 7/2011 Weaver ............. G08B 13/1966 348/143

(Continued)

OTHER PUBLICATIONS

James B.B. Joshi, “A Generalized Temporal Role-Based Access Control Model”, IEEE, Jan. 2005, pp. 1-20.*

(Continued)

*Primary Examiner* — Jennifer N Welch

(57) ABSTRACT

A computer-implemented method includes detecting, by operation of video analytics, an object within a portion of initial video captured by a security camera. The security camera is within and forms a part of a security system site. The computer-implemented method also includes transmitting, to at least one computing device that is remote from the security system site, a request that includes video data. The request relates to the object and the initial video. A response is received from the at least one computing device. The response includes computer readable instructions, retrieved from storage remote from the security system site, for at least one temporary analytic. The at least one temporary analytic is initiated to act upon the initial video or subsequent video captured by the security camera.

20 Claims, 5 Drawing Sheets

(56) References Cited

U.S. PATENT DOCUMENTS

| | | | |
|---|---|---|---|
| 2015/0242601 | A1 | 8/2015 | Griffiths et al. |
| 2018/0285767 | A1 | 10/2018 | Minegishi et al. |
| 2019/0034734 | A1* | 1/2019 | Yen .................... G06F 18/2413 |
| 2019/0370618 | A1 | 12/2019 | Mazzarella et al. |
| 2020/0193732 | A1* | 6/2020 | Nagarathinam ....... G06V 20/44 |
| 2020/0296452 | A1 | 9/2020 | Drolia et al. |
| 2021/0004552 | A1 | 1/2021 | Son |
| 2021/0144211 | A1* | 5/2021 | Schnieders ............ H04L 67/12 |

OTHER PUBLICATIONS

The International Search Report and the Written Opinion, corresponding patent application No. PCT/US2022/025682, filed: Apr. 21, 2022, mailed: Jul. 26, 2022, all pages.

Chaaraoui, Alexandros & Padilla-López, José & Ferrandez, Javier & Nieto-Hidalgo, Mario & Flórez-Revuelta, Francisco. (2014). A Vision-Based System for Intelligent Monitoring: Human Behaviour Analysis and Privacy by Context. Sensors. 14. 8895-8925. 10.3390/s140508895.

* cited by examiner

TEMPORARY ANALYTIC WITHIN SECURITY SYSTEM SITE

BACKGROUND

Intelligent processing and analysis of security video can be an important function for a robust and effective security system to be able to provide. For example, a security system may include many cameras, each of which captures respective security video. The total amount of security video captured by those cameras, much of which is typically captured by different cameras concurrently, makes it inefficient to rely upon manual location and tracking of objects of interest. Intelligent processing and analysis of security video is thus becoming increasingly important.

For systems that include a large number of video cameras, a proportionally large number of detected events may also be expected. Video streams capturing the events may be shown on a display for review by an operator. However, with many different events being detected, as well as differences in the priorities of the events (for example, simple motion of an object vs. a person detected in a restricted area), it can be difficult for operators to efficiently assimilate the information presented to them on the display, and rapidly identify those events that may be dismissed as benign, and those events that require more of their attention. Thus, it again holds true that intelligent processing and analysis of security video is becoming increasingly important.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
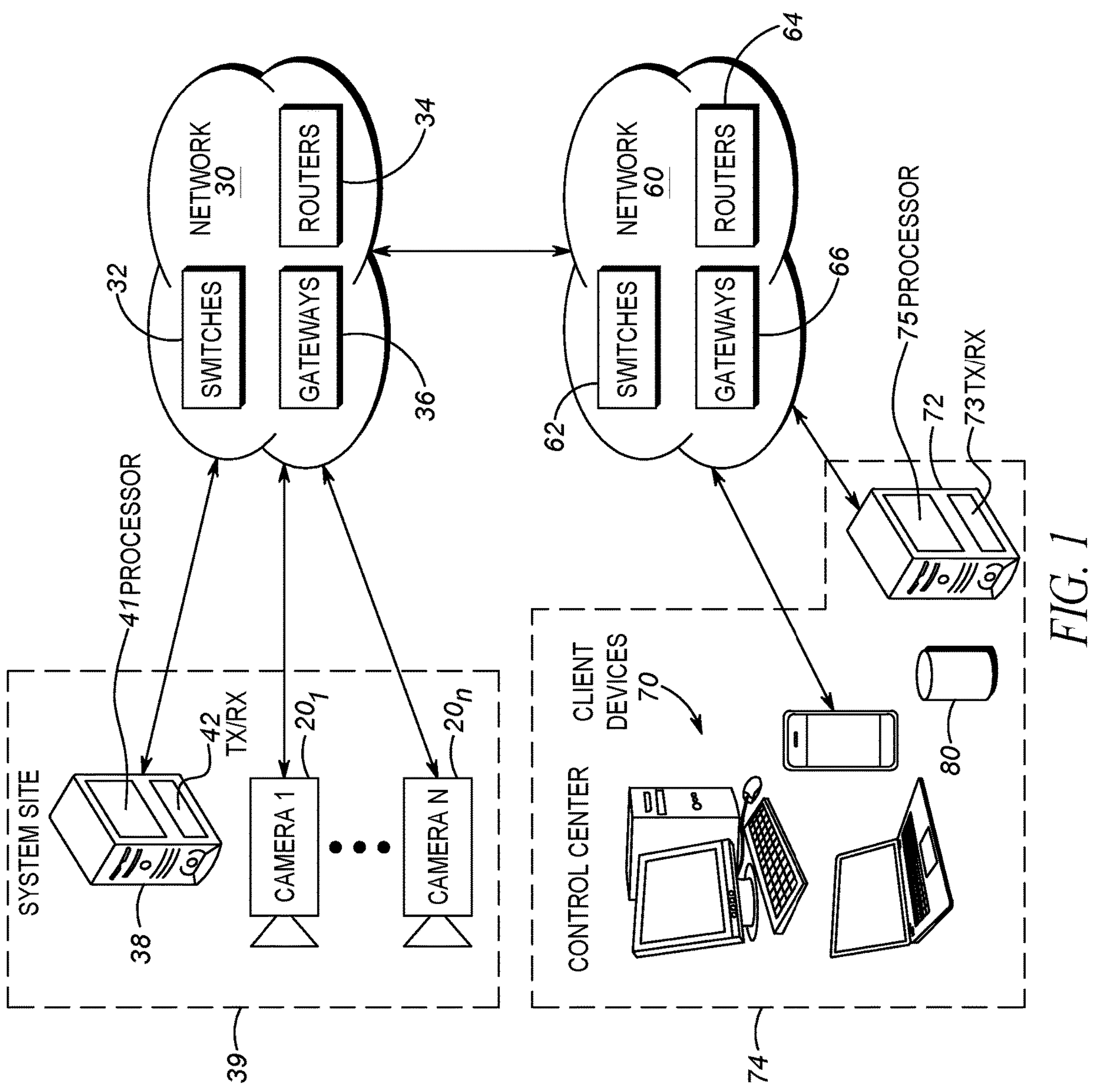
FIG. 1 is a block diagram of a multi-site system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method that includes detecting, by operation of video analytics, an object within a portion of initial video captured by a security camera. The security camera is within and forms a part of a security system site. The computer-implemented method also includes transmitting, to at least one computing device that is remote from the security system site, a request that includes video data. The request relates to the object and the initial video. The computer-implemented method also includes receiving a response from the at least one computing device. The response includes computer readable instructions (retrieved from storage remote from the security system site) for at least one temporary analytic. The computer-implemented method also includes initiating the at least one temporary analytic to act upon the initial video or subsequent video captured by the security camera.

In accordance with another example embodiment, there is provided a system that includes at least one video camera that is within and forms a part of a security system site. The at least one video camera is configured to capture initial and subsequent video. The system also includes at least one processor, housed within or communicatively coupled to the at least one video camera. The at least one processor is configured to: detect, by operation of video analytics, an object within a portion of the initial video; and initiate the at least one temporary analytic to act upon the initial video or the subsequent video. The system also includes at least one transceiver configured to: transmit, to at least one computing device that is remote from the security system site, a request that includes video data, wherein the request relates to the object and the initial video; and receive a response from the at least one computing device. The response includes computer readable instructions, retrieved from storage remote from the security system site, for at least one temporary analytic.

In accordance with yet another example embodiment, there is provided a multi-site system that includes at least one video camera that is within and forms a part of a security system site. The at least one video camera is configured to capture initial and subsequent video. The multi-site system also includes at least one processor, housed within or communicatively coupled to the at least one video camera. The at least one processor is configured to detect, by operation of video analytics, an object within a portion of the initial video. The at least one processor is also configured to initiate the at least one temporary analytic to act upon the initial video or the subsequent video. The multi-site system also includes at least one transceiver configured to transmit, to at least one computing device that is remote from the security system site, a request that includes video data. The request relates to the object and the initial video. The at least one transceiver is also configured to receive a response from the at least one computing device. The response includes computer readable instructions, retrieved from storage remote from the security system site, for at least one temporary analytic. The multi-site system also includes a control center that includes the at least one computing device and a database coupled to the at least one computing device. The at least one computing device is configured to run at least one query on the database based on the video data.

Each of the above-mentioned embodiments will be discussed in more detail below, starting with example system and device architectures of the system in which the embodiments may be practiced, followed by an illustration of processing blocks for achieving an improved technical method, device, and system for temporary analytics within security system sites.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, etc. The terms "object" and "object of interest" are used herein synonymously.

Further advantages and features consistent with this disclosure will be set forth in the following detailed description, with reference to the figures.

Reference is now made to FIG. 1, which is a block diagram of a multi-site system 10. The illustrated multi-site system 10 includes a plurality of cameras $\mathbf{20}_1$-$\mathbf{20}_n$ which are coupled to a network 30 (which may comprise a plurality of networks, even though shown as a single network in FIG. 1 for convenience of illustration). The network 30 can include the Internet, or one or more other public/private networks coupled together by communication elements: for example, one or more network switches 32, one or more routers 34, and/or one or more gateways 36. The network 30 could be of the form of, for example, client-server networks, peer-to-peer networks, etc. Data connections between any of the cameras $\mathbf{20}_1$-$\mathbf{20}_n$ and other network devices can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links).

In the illustrated example embodiment, the cameras $\mathbf{20}_1$-$\mathbf{20}_n$ and server 38 form part of a same security system site 39 and may, for example, all be within the same Local Area Network (LAN). Also, although in FIG. 1 the network 30 is shown outside of the security system site 39, this is simply for convenience of illustration (it is also contemplated that the network 30 may alternatively be within the security system site 39, particularly where all network addressable devices of the system site are within fairly close geographic proximity to each other). Also, although the illustrated multi-site system 10 is shown to include one system site, this is simply for convenience of illustration. More than one (any suitable number of) system sites similar to the system site 39 is also contemplated.

Still with reference to FIG. 1, the cameras $\mathbf{20}_1$-$\mathbf{20}_n$ communicate data and information to and from other network devices via the network 30. For instance, the cameras $\mathbf{20}_1$-$\mathbf{20}_n$ transmit video data to one or more other network devices via the network 30. As another example, the cameras $\mathbf{20}_1$-$\mathbf{20}_n$ may receive command and control instructions from other network devices (for instance, the server 38) via the network 30. Some or all of the cameras $\mathbf{20}_1$-$\mathbf{20}_n$ may each include a video analytics engine for carrying out video analytics (whether normal or temporary).

In the illustrated example embodiment, the server 38 is coupled to the network 30 to receive data and information from other devices on the network 30 such as, for example, any of the cameras $\mathbf{20}_1$-$\mathbf{20}_n$. The illustrated server 38 includes, amongst other electronic components not shown for convenience of illustration, at least one processor 41 and at least one transceiver 42. The server 38 may be a Video Management System (VMS) server; however it need not necessarily be so (for instance, it may simply control and manage certain aspects of the cameras $\mathbf{20}_1$-$\mathbf{20}_n$, including their respective operations and functioning, as described herein in detail).

Regarding the network 60, this may comprise a plurality of networks even though shown as a single network in FIG. 1 for convenience of illustration. The network 60 can include the Internet, or one or more other public/private networks coupled together by communication elements: for example, one or more network switches 62, one or more routers 64, and/or one or more gateways 66. The network 60 could be of the form of, for example, client-server networks, peer-to-peer networks, etc. Data connections between any of client devices 70 and server 72 (which together form part of a control center 74) can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). Although in the illustrated example embodiment the network 30 and the network 60 are shown as separate, in some alternative examples there may be some overlap and commonality between the network 30 and the network 60. In at least one alternative example, the network 60 and the network 30 may be the same network. Also, although in FIG. 1 the network 60 is shown outside of the control center 74, this is simply for convenience of illustration (it is also contemplated that the network 60 may be within the control center 74). Also, regarding the client devices 70, examples of the type of contemplated devices include a computer terminal within a mission control center, a smartphone, a desktop computer, a laptop, a tablet, a phablet, etc.

Figure 2:
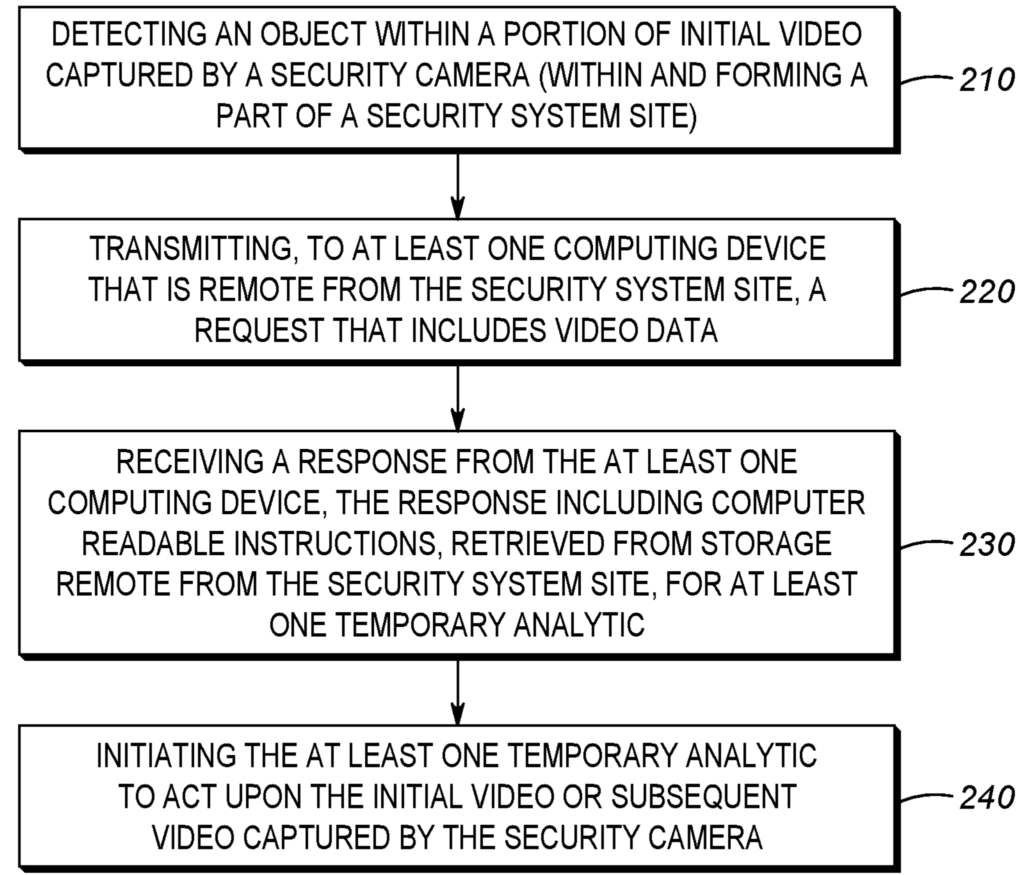
FIG. 2 is a flow chart illustrating a method for deploying a temporary analytic in accordance with example embodiments.

Reference is now made to FIG. 2. FIG. 2 is a flow chart illustrating a method 200 for deploying a temporary analytic, within a security system site, in accordance with example embodiments.

Figure 3:
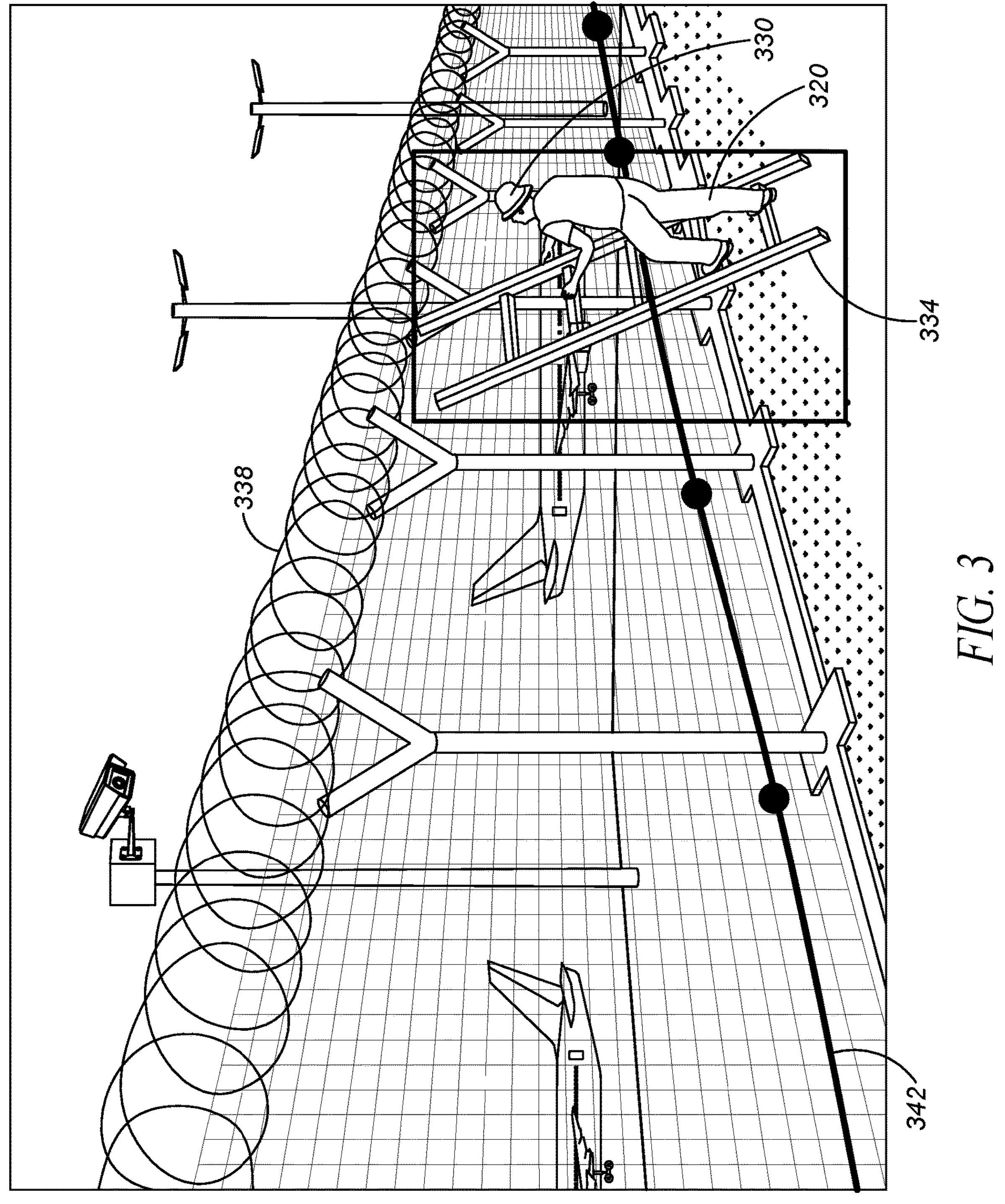
FIG. 3 shows an example video image captured by a camera of the multi-site system of FIG. 1.

The illustrated method 200 includes first detecting (210) an object within a portion of initial video captured by a security camera (within and forming a part of a security system site). For example, with reference to the example video image shown in FIG. 3, a person 320 may be detected by one of the cameras $\mathbf{20}_1$-$\mathbf{20}_n$ which form part of the system site 39.

Next, a request, that includes video data, is transmitted (220) to at least one computing device that is remote from the security system site. For example, the transceiver 42 within the server 38 may transmit the request over the networks 30 and 60 to a computing device (for example, the server 72 or one of the client devices 70) within the control center 74. Alternatively, instead of the server 38 one of the cameras $\mathbf{20}_1$-$\mathbf{20}_n$, that captured the video data being transmitted may additionally carry out the transmission of the request to the control center 74.

Next, a response is received (230) from at least one computing device. The response includes computer readable instructions, retrieved from storage remote from the security system site, for at least one temporary analytic. For example, a storage 80 within the control center 74 may store the computer readable instructions for the at least one temporary analytic, and the server 72 (which includes at least one processor 75) in communication with this storage may transmit the response, over the networks 60 and 30 (and destined for the system site 39). This communication may be by operation of the transceiver 73. Alternatively, one of the client devices 70 (equipped with its own respective transceiver) may be in communication with the storage 80 (to retrieve the at least one temporary analytic, and thereafter transmit the response over the networks 60 and 30 in a manner similar as described above). Finally, it will be understood that although the storage 80 is illustrated within the control center 74, it may alternatively be located outside and remote from a location of the control center 74. In at least one example, the storage 80 may be in the cloud.

Continuing on in the method 200, the at least one temporary analytic is initiated (240) to act upon the initial video or subsequent video captured by the security camera. For example, the at least one temporary analytic may be put into operation within the server 38 and/or one of the cameras $\mathbf{20}_1$-$\mathbf{20}_n$. For example, referring again to the example of FIG. 3, a temporarily-deployed, safety analytic may, through video analytics, determine that the person 320 is wearing a hard hat 330.

Figure 4:
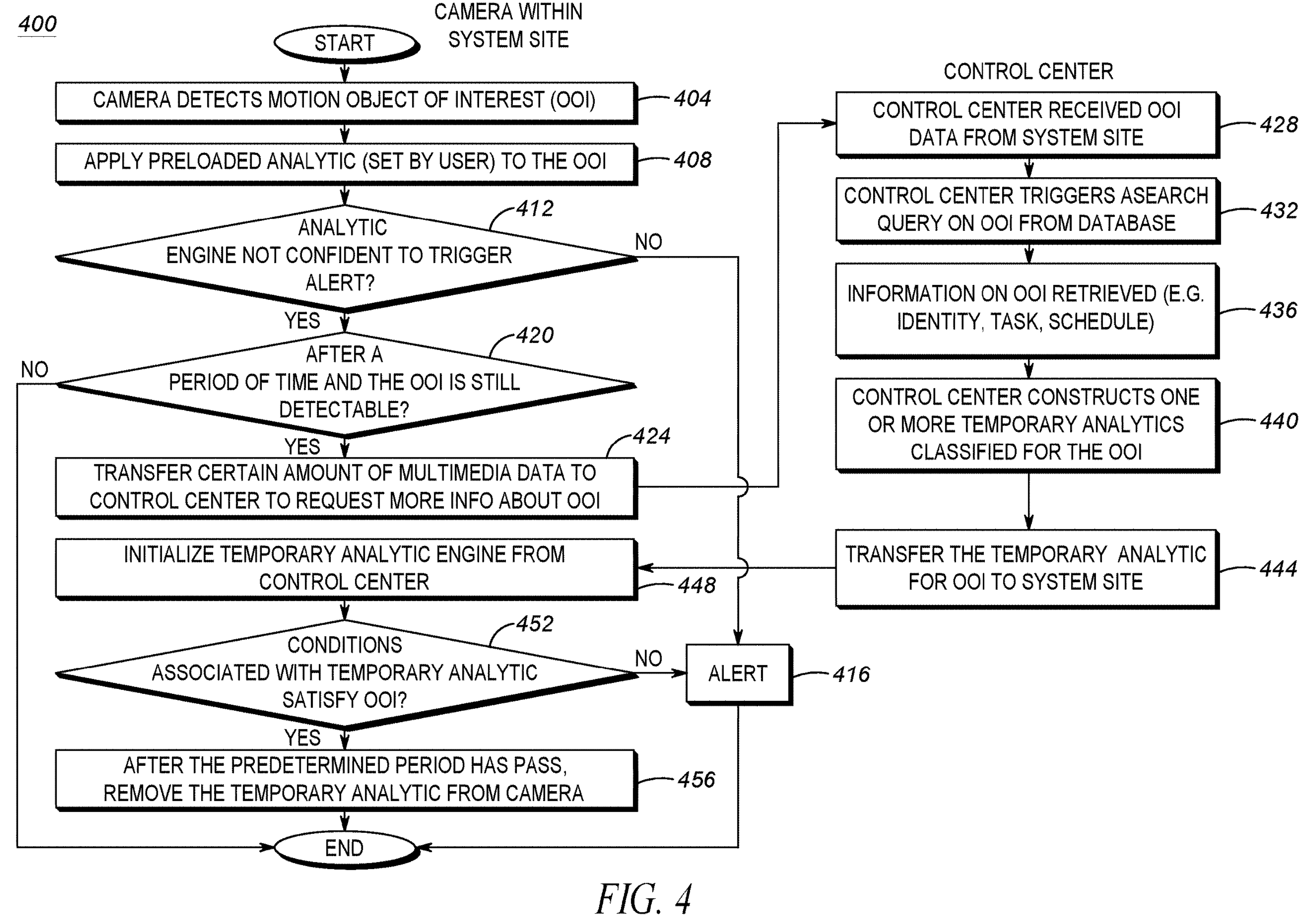
FIG. 4 is a flow chart illustrating another method with flow chart boxes having similarities to, but being collectively more extensive than those shown in FIG. 2, in accordance with an example embodiment.

Reference is now made to FIG. 4 which is a flow chart illustrating a method 400 in accordance with an example embodiment. The method 400 is similar to the previously described method 200, but it is also noted that, as compared to the method 200, the method 400 is herein described with more extensive and specific details.

First (following "START") in the method 400, a camera (for example, one of the cameras $\mathbf{20}_1$-$\mathbf{20}_n$ within the system site 39) detects (404) motion of an object of interest. Next, a preloaded analytic is applied (408) to the object of interest (as set by, for example, the user of the system). For instance, returning to the example of FIG. 3, the person 320 may ascend or descend a ladder 334 that has been rested against a razor wire fence 338. In so doing, the person 320 may trip a virtual tripwire 342 (for example, by operation of video analytics detecting that he has moved from one side of the virtual tripwire 342 to an opposite side).

Continuing on, next in the method 400 is decision action 412. For the decision action 412, an analytics engine makes a determination of whether or not the confidence level of a rule violation has not exceeded a confidence threshold. If "NO" (i.e. the confidence threshold is exceeded), then an alert (for example, an alarm) occurs (416). If "YES", then a decision action 420 follows the decision action 412.

For the decision action 420, a determination is made as to whether the object of interest is still detectable after a period of time. If "NO", then no further action is taken (for example, the video analytics rule may be that since the object of interest was detected within a camera's field of view for only a short period of time, then it should be treated as no longer of concern). If "YES", then next a certain amount of multimedia data (for example, a video clip and/or associated metadata) is transferred (424) from the system site 39 to the control center 74, as a request for more information about the object of interest.

Next in the method 400, the control center 74 receives (428) the multimedia data from the system site 39. For example, the multimedia data may be communicated over the networks 30 and 60 in a manner consistent with what was previously described in connection with the method 200 of FIG. 2.

Next in the method 400, the control center 74 triggers (432) a search query on the object of interest from a database (for example, a database within the storage 80). Next, information on the object of interest (for example, object identity information, object task information, object authenticity information, object hierarchy information, and/or object-related schedule information) are retrieved (436). Regarding object hierarchy information, this may relate to clearance level of the person (object of interest) based on job role or responsibility. For example, in a hospital environment one or more different/modified analytic rules may be applied to the orderly than would to some other worker such as a doctor, for instance.

Next in the method 400, the control center 74 constructs (440) one or more temporary analytics classified for the object of interest. It will be understood that the location information obtained from the system site 39 may be employed by the server 72 in constructing the one or more temporary analytics. For instance, if the object of interest is at a location corresponding to a construction region, then an analytic relating to the wearing of personal safety article(s) (for example, hard hat) may be appropriate. As another example, say the object of interest is at a location corresponding to high speed rail track, the temporary analytic(s) in such case may relate to, for instance, checking whether reflective clothing is being warn and whether the object of interest is staying on the appropriate side of a yellow line.

Next, the at least one temporary analytic for the object of interest is transferred (444) to the system site 39. The transfer may be over the networks 60 and 30 in a manner consistent with what was previously described in connection with the method 200 of FIG. 2. Next, having been transferred to the system site 39, the at least one temporary analytic from the control center 74 is initialized within the system site 39.

Figure 5:
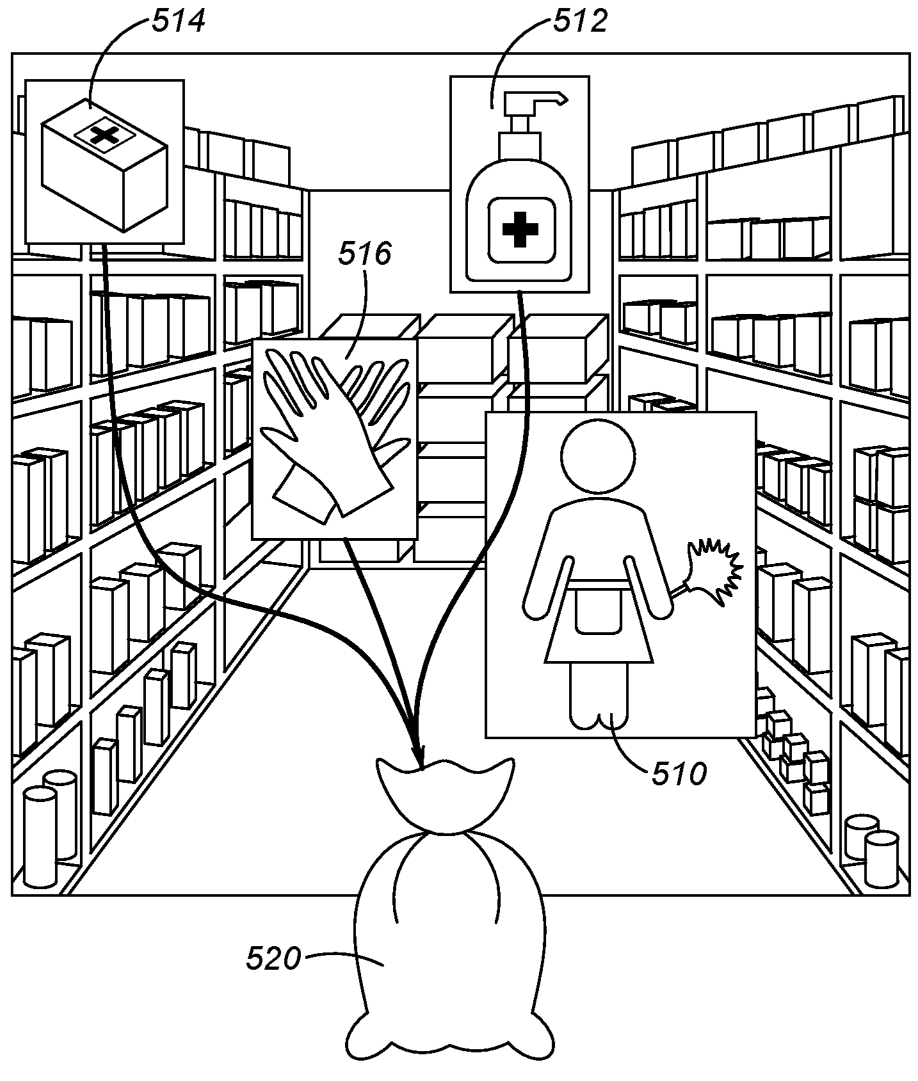
FIG. 5 shows an example video image, with diagrammatic annotations, captured by a camera of the multi-site system of FIG. 1.

Continuing on, decision action 452 follows the action 448. For the decision action 452, a processor (for example, the processor 41 within the server 38 or a processor with one of the cameras $20_1$-$20_n$) determines whether or not conditions associated with the at least one temporary analytic are satisfied. If "NO", the alert (for example, an alarm) occurs (416). Illustrative of this part of the method 400 is the diagrammatically annotated, example video image of FIG. 5. In FIG. 5, a person 510 is in a restricted-access, medical supplies room putting various items (i.e. hand sanitizer 512, a box of medication 514 and gloves 516) in a plastic bag 520. If the day and time for the person 510 is not matching object-related schedule information needed to validate use of the associated temporary analytic, then this may be indicative of potential untimely removal (e.g. theft) from the medical supplies room, thus potentially justifying an alarm. Alternatively, conditions can relate to authorized vs. unauthorized regions of a field of view of a camera. Presence of an object of interest in an unauthorized region may trigger an alert prior to expiry of the at least one temporary analytic.

Continuing on, if "YES" (i.e. the conditions associated with the at least one temporary analytic are determined to be satisfied), then the at least one temporary analytic is removed (456) after a predetermined period of time (which may be provided in the response from the control center) has passed (for example, passed because an end time is reached, where the end time is derived or otherwise obtained from information included in the response from the control center).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot deploy at least one temporary analytic within a security system site, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:

detecting, by operation of video analytics, an object within a portion of an initial video captured by a security camera, wherein the security camera is within and forms a part of a security system site;

transmitting, to at least one computing device that is remote from the security system site, a request that includes video data, wherein the request relates to the object and the initial video;

receiving a response from the at least one computing device, the response including computer readable instructions, retrieved from storage that is remote from the security system site, for at least one temporary analytic corresponding to a job responsibility and associated schedule predefined for the object; and initiating the at least one temporary analytic to act upon the initial video or a subsequent video captured by the security camera, wherein the at least one temporary analytic is prescribed corresponding to the job responsibility, the associated schedule, and worker-hierarchy information specific to a first clearance level of a plurality of different worker clearance levels associated with respective different categories of workers predefined in the storage that is remote from the security system site.

2. The computer-implemented method as claimed in claim 1 further comprising:

determining, prior to the transmitting, that a confidence level for triggering an alert in relation to the object is below a threshold, and wherein the transmitting is in response to the confidence level being below the threshold.

3. The computer-implemented method as claimed in claim 2 further comprising:

determining, after the initiating of the at least one temporary analytic, that conditions associated with the at least one temporary analytic are not satisfied; and generating an alert, within the security system site, in response to the determining, and irrespective that the at least one temporary analytic has not expired.

4. The computer-implemented method as claimed in claim 1 wherein the response includes an end time for the at least one temporary analytic, and the computer-implemented method further comprises terminating operation of the at least one temporary analytic once the end time is reached.

5. The computer-implemented method as claimed in claim 1 further comprising:

receiving the request at a control center that includes the at least one computing device and a database coupled to the at least one computing device; and running at least one query on the database based on the video data.

6. The computer-implemented method as claimed in claim 5 wherein:

the database returns, in response to the at least one query, information about the object, the response includes object location information as part of the information, and the computer-implemented method further comprises:

processing the object location information within the security system site to determine at least one unauthorized region of a field of view of the security camera; and generating an alert, within the security system site, when the object enters the unauthorized region.

7. The computer-implemented method as claimed in claim 5 wherein:

the database returns, in response to the at least one query, information about the object, the response includes the object-related schedule information as part of the information, and the computer-implemented method further comprises:

processing the object-related schedule information within the security system site; and generating an alert, within the security system site, when the object is in violation of the object-related schedule information.

8. The computer-implemented method as claimed in claim 1 wherein the security camera includes a video analytics engine configured to carry out the at least one temporary analytic.

9. The computer-implemented method as claimed in claim 1 wherein the object is a person or a vehicle.

10. The computer-implemented method as claimed in claim 1 further comprising:

determining, prior to the transmitting, that a confidence level for triggering an alert in relation to the object is below a threshold, and wherein the transmitting is in response to satisfying of conditions that both:

the confidence level is below the threshold, and the object remains detected within the initial video for at least a defined period of time.

11. A system comprising:

at least one video camera that is within and forms a part of a security system site, and the at least one video camera being configured to capture an initial and a subsequent video;

at least one processor, housed within or communicatively coupled to the at least one video camera, and the at least one processor configured to:

detect, by operation of video analytics, an object within a portion of the initial video; and initiate at least one temporary analytic to act upon the initial video or the subsequent video, wherein the at least one temporary analytic is prescribed corresponding to a job responsibility, an associated schedule predefined for the object, and worker-hierarchy information specific to a first clearance level of a plurality of different worker clearance levels associated with respective different categories of workers predefined in the storage that is remote from the security system site; and at least one transceiver configured to:

transmit, to at least one computing device that is remote from the security system site, a request that includes video data, wherein the request relates to the object and the initial video; and receive a response from the at least one computing device, the response including computer readable instructions, retrieved from storage that is remote from the security system site, for the at least one temporary analytic corresponding to the job responsibility and the associated schedule predefined for the object.

12. The system as claimed in claim 11 wherein:

the at least one processor is further configured to determine that a confidence level for triggering an alert in relation to the object is below a threshold, and the request that includes the video data is transmitted in response to the confidence level being below the threshold.

13. The system as claimed in claim 12 wherein:

the at least one processor is further configured to:

determine, after the at least one temporary analytic is initiated, that conditions associated with the at least one temporary analytic are not satisfied; and generate an alert, within the security system site, in response to the conditions being determined to be not satisfied, and irrespective that the at least one temporary analytic has not expired.

14. The system as claimed in claim 11 wherein the response includes an end time for the at least one temporary analytic, and the at least one processor is further configured to terminate operation of the at least one temporary analytic once the end time is reached.

15. The system as claimed in claim 11 wherein the at least one video camera includes a video analytics engine configured to carry out the at least one temporary analytic.

16. The system as claimed in claim 11 wherein the object is a person or a vehicle.

17. The system as claimed in claim 11 wherein:

the at least one processor is further configured to determine that a confidence level for triggering an alert in relation to the object is below a threshold, and the request that includes the video data is transmitted in response to satisfying of conditions that both:

the confidence level is below the threshold, and the object remains detected within the initial video for at least a defined period of time.

18. A multi-site system comprising:

at least one video camera that is within and forms a part of a security system site, and the at least one video camera being configured to capture an initial and a subsequent video;

at least one processor, housed within or communicatively coupled to the at least one video camera, and the at least one processor configured to:

detect, by operation of video analytics, an object within a portion of the initial video; and initiate at least one temporary analytic to act upon the initial video or the subsequent video, wherein the at least one temporary analytic is prescribed corresponding to a job responsibility, an associated schedule predefined for the object, and worker-hierarchy information specific to a first clearance level of a plurality of different worker clearance levels associated with respective different categories of workers predefined in the storage that is remote from the security system site;

at least one transceiver configured to:

transmit, to at least one computing device that is remote from the security system site, a request that includes video data, wherein the request relates to the object and the initial video; and receive a response from the at least one computing device, the response including computer readable instructions, retrieved from storage that is remote from the security system site, for the at least one temporary analytic corresponding to the job responsibility and the associated schedule predefined for the object; and a control center that includes the at least one computing device and a database coupled to the at least one computing device, and wherein the at least one computing device is configured to run at least one query on the database based on the video data.

19. The multi-site system as claimed in claim 18 wherein:

the database is configured to return, in response to the at least one query, information about the object, the response includes the object location information as part of the information, and the at least one processor is further configured to:

process the object location information to determine at least one unauthorized region of a field of view of the at least one video camera; and generate an alert when the object enters the unauthorized region.

20. The multi-site system as claimed in claim 18 wherein:

the database is configured to return, in response to the at least one query, information about the object, the response includes the object-related schedule information as part of the information, and the at least one processor is further configured to:

process the object-related schedule information; and generate an alert when the object is in violation of the object-related schedule information.

* * * * *